(12) United States Patent
Christensen

(10) Patent No.: US 8,617,629 B2
(45) Date of Patent: Dec. 31, 2013

(54) METHOD OF PREPARING A TUBER

(76) Inventor: Stanley Christensen, Grace, ID (US)

( * ) Notice: Subject to any disclaimer, the term of this patent is extended or adjusted under 35 U.S.C. 154(b) by 21 days.

(21) Appl. No.: 13/295,369

(22) Filed: Nov. 14, 2011

(65) Prior Publication Data

US 2013/0122163 A1 May 16, 2013

(51) Int. Cl.
*A23L 1/216* (2006.01)

(52) U.S. Cl.
USPC .............................. 426/282; 426/284; 426/637

(58) Field of Classification Search
USPC .......................................... 424/282, 284, 637
See application file for complete search history.

(56) References Cited

U.S. PATENT DOCUMENTS

| | | | |
|---|---|---|---|
| 2,130,533 A | 9/1938 | Barton | |
| 3,057,732 A | 10/1962 | Conrad et al. | |
| 4,520,034 A | 5/1985 | Ishii et al. | |
| 5,128,210 A | 7/1992 | Housley | |
| 6,180,145 B1 | 1/2001 | Ricks | |
| 6,692,782 B1 | 2/2004 | Hayes-Jacobson et al. | |
| 8,343,564 B2 * | 1/2013 | Kerr et al. | 426/637 |
| 2003/0118698 A1 | 6/2003 | Lindsey | |

FOREIGN PATENT DOCUMENTS

| | | |
|---|---|---|
| DE | 3229363 | 2/1984 |
| EP | 152218 | 8/1985 |
| WO | 9107883 | 6/1991 |
| WO | 01-49136 A1 | 7/2001 |

OTHER PUBLICATIONS

Korean Intellectual Property Office, PCT Search Report and Written Opinion, dated Mar. 28, 2013, 9 pages, Republic of South Korea.

* cited by examiner

*Primary Examiner* — Lien T Tran
(74) *Attorney, Agent, or Firm* — B. Craig Killough; Barnwell Whaley

(57) ABSTRACT

A method of preparing a tuber for consumption, with the tuber having added food ingredients in the tuber. The tuber is thoroughly cooked. The tuber is then frozen to provide rigidity about the skin of the tuber, while leaving a portion of the flesh unfrozen. The skin of the tuber is pierced, preferably at an end of the tuber, forming a hole in the skin. The flesh of the tuber is accessed through the hole of in skin, and the flesh of the tuber is disturbed or disrupted. The desired added food material is inserted through the hole in the skin and into the disrupted flesh of the tuber. The tuber may then be completely frozen for later preparation and consumption.

12 Claims, 5 Drawing Sheets

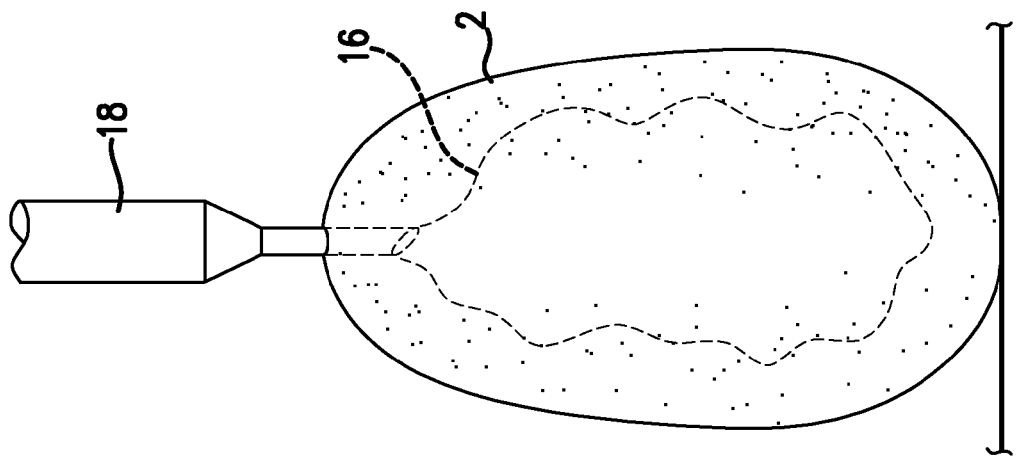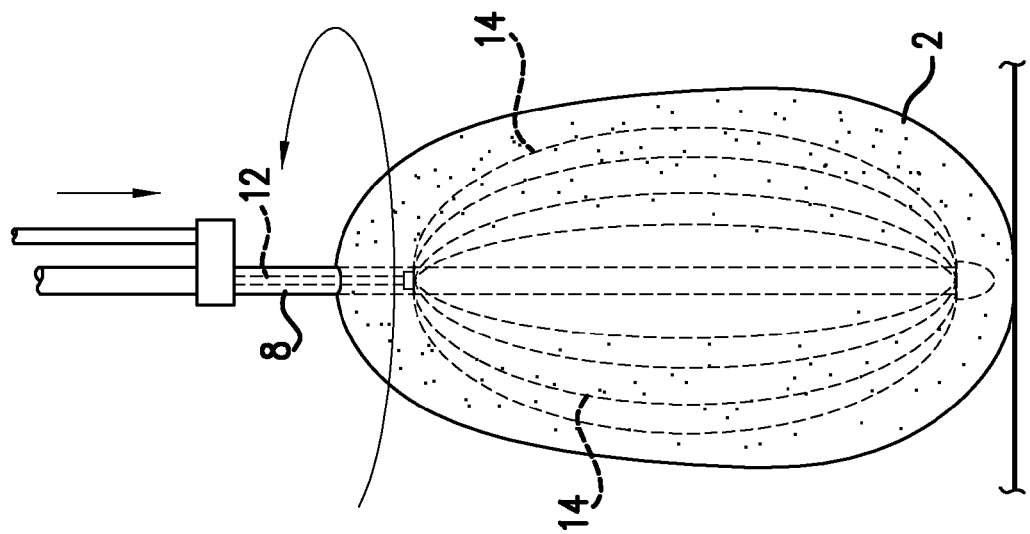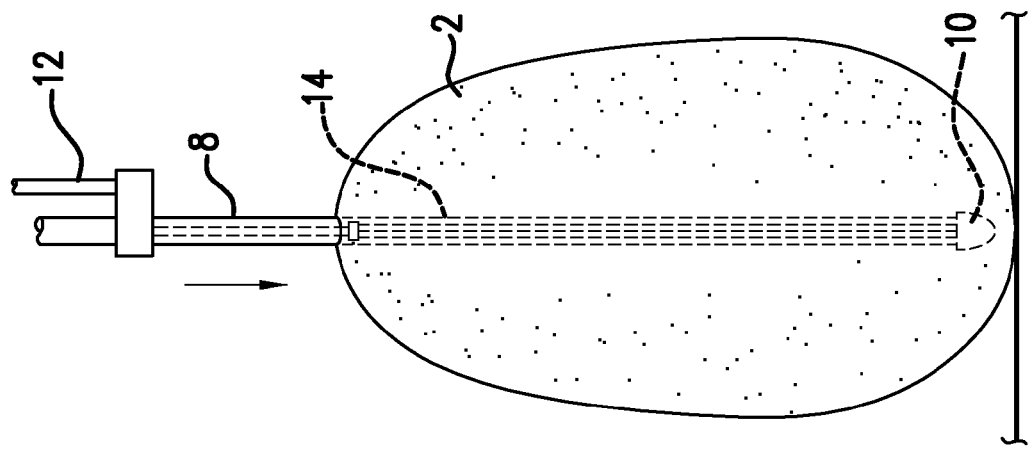

METHOD OF PREPARING A TUBER

FIELD OF THE INVENTION

This invention relates to the processes for preparing manufactured foods products, and is more particularly directed to a method of providing tubers with additional food ingredients.

BACKGROUND OF THE INVENTION

Tubers are a common food product. There are literally thousands of recipes and methods for preparing tubers for consumption. Tubers such as potatoes and sweet potatoes are cooked for consumption, such as by baking or microwaving. It is common for consumers to split the skin of the tuber and add other food products to the tuber, such as butter, cheese, sour cream, chives, pepper, and many other dairy, meat and vegetable products.

There is a need for a method of preparation of tubers which will allow such food products to be inserted into the tuber with minimal disruption to the skin. The resulting product should be easy for the consumer to prepare for consumption. The process for producing the resulting tuber products should be capable of volume processing.

SUMMARY OF THE INVENTION

The present invention is a method of preparing a tuber for consumption, with the tuber having added food ingredients in the tuber. The tuber is thoroughly cooked. The tuber is then frozen to provide rigidity about the skin of the tuber, while leaving a portion of the flesh unfrozen. The skin of the tuber is pierced, preferably at an end of the tuber, forming a hole in the skin. The flesh of the tuber is accessed through the hole of the skin, and the flesh of the tuber is disturbed or disrupted. The desired added food material is inserted through the hole in the skin and into the disrupted flesh of the tuber. The tuber may then be completely frozen for later preparation and consumption.

BRIEF DESCRIPTION OF THE DRAWINGS

FIG. 3 demonstrates a contracted rotary device inserted through an end of a potato.

FIG. 4 demonstrates the rotary device as expanded, and rotating internally in the tuber to disturb the flesh of the potato.

FIG. 5 demonstrates additional food being inserted into the potato.

DESCRIPTION OF PREFERRED EMBODIMENTS

The present invention is useful for preparing tubers. It is anticipated that the primary utility of the present invention will be for the preparing of potatoes, but the invention has utility for any tuber that has an outside skin surrounding an edible material. For example, a potato has an outside skin, and edible material that is internal to the skin. The edible material is referred to herein as the "flesh" of the tuber. The preferred embodiments herein use a potato as an example, but other tubers may be used according to the method and process as set forth herein.

In a preferred embodiment, the potato is first cooked. The potato should be cooked sufficiently that the flesh is softened for subsequent disturbance or mashing of the flesh as described herein. The flesh of the tuber is hard before cooking, and is therefore resistant to being disturbed or mashed, but after cooking the flesh is softened and is easy to disturb or mash. Since, in some embodiments, the potato will be heated and additionally cooked after the food material is inserted into the potato, it may not be desirable to thoroughly cook the potato in this step. In other embodiments, even if the potato is subsequently heated, it may be desirable to thoroughly cook the potato during this initial step. In either case, the potato is cooked to soften the flesh.

Figure 1:
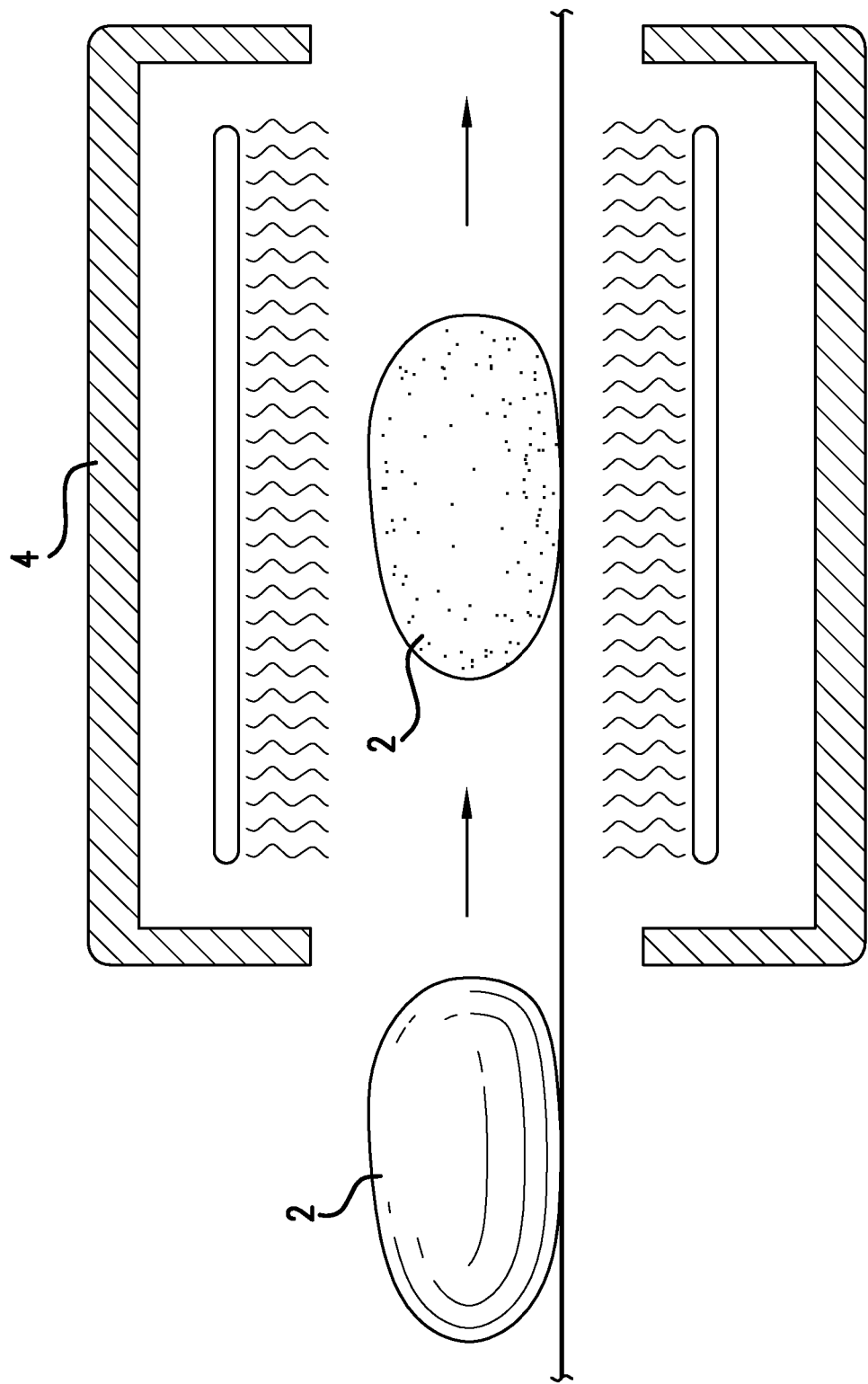
FIG. 1 demonstrates potatoes on a conveyor passing through an oven.

As shown in FIG. 1, in one embodiment, multiple potatoes 2 are placed on a conveyor that transports the potatoes through an oven 4. As the potatoes pass through the oven, they are cooked. The oven may be a microwave oven, or it may be an oven that uses resistance heating, steaming or other known methods of cooking or baking food items.

Figure 2:
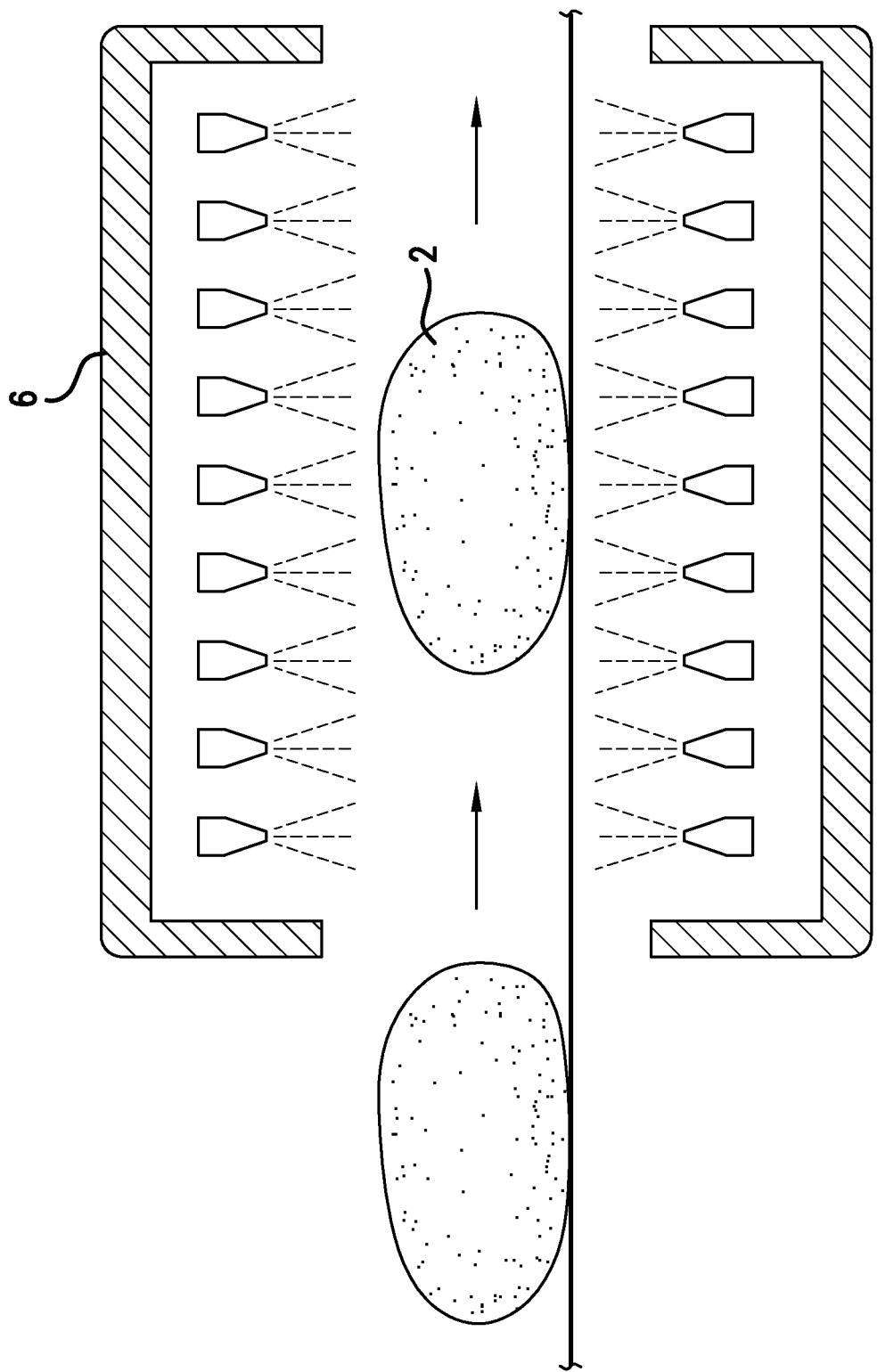
FIG. 2 demonstrates potatoes passing through a flash-freezing device.

After the potato is cooked, the skin of potato is frozen, such as by flash freezing. FIG. 2 demonstrates potatoes passing through a flash freezer 6. The skin of the potato is flash-frozen sufficiently to make the skin of the cooked potato firm. It is preferred that the skin of the potato is thoroughly flash-frozen, while leaving as much of the flesh of the potato soft from cooking as is possible. Freezing forms a hard outer shell that resists breaking the skin by rotation of the rotary tool inside the potato as described herein, while leaving the flesh soft for ease of mashing by the rotary tool.

FIGS. 3 and 4 demonstrate a preferred embodiment of disturbing or mashing the interior of the potato 2. A hole is formed in the skin of the potato while the skin remains frozen. The hole may be formed by a sharp end 10 of the rotary tool 8 as shown in FIG. 3. When used according to this embodiment, the rotary tool is inserted into an end of the potato, forming a hole in the end of the potato. The rotary tool is in a collapsed position so that the hole formed in the potato is substantially smaller than the maximum radius of the expanded rotary tool.

As demonstrated by FIG. 4, after the rotary tool is inserted into the potato, the rotary tool is actuated, and it rotates within the interior of the potato. The rotary tool disturbs the flesh of the potato, to mash the flesh of the potato. The flesh of the potato is soft and not frozen, while the skin of the potato remains frozen to resist breaking the skin.

In the embodiment shown, the rotary tool is expanded by a control rod 12 assembly that is advanced downwardly to force leaves 14 of the rotary tool outward. It may be necessary to begin rotating the rotary tool prior to forcing the leaves outward, since it is easier to force the leaves outward as the interior contents of the potato are progressively mashed by the tool. In a preferred embodiment, the rotary tool comprises metallic wires, such as wires formed of stainless steel, nitinol or other similar corrosion resistant metals. The wires are relatively thin, and are sufficient to disturb or mash the flesh of the potato, while being small enough to minimize resistance from the flesh of the potato.

In another embodiment, and without being bound by theory, the rotary tool may comprise leaves that expand outwardly due to centrifugal force from rotation of the device.

After the flesh of the potato is sufficiently disturbed, the rotary tool is collapsed and withdrawn from the potato, such as by retracting the control rod to collapse the leaves. Other food is injected into the potato through the hole formed in the end of the potato. The food material 16 is preferred to be liquefied, and/or pulverized and transported by a liquid carrier, such that the viscosity allows the material to be injected with sufficient force to penetrate from one end of the potato to substantially the oppose end of the potato, as demonstrated by FIG. 5.

One or more food materials are injected into the potato. In one embodiment, a flowable cheese product or similar flowable and edible material is injected into the hole, with the material injected at a sufficiently low viscosity and significant pressure and force to fill the potato from substantially one end to substantially the opposite end. In one embodiment, the material is injected by an injector 18 with the longitudinal of the axis of the potato being positioned vertically, as shown in FIG. 5, so that gravity assists in allowing the material to flow towards to the bottom of the potato, even in view of the resistance of the disturbed or mashed flesh. Maintaining the potato in this position even after the injector is removed may assist in allowing the contents to migrate toward the opposite end of the potato.

Figure 6:
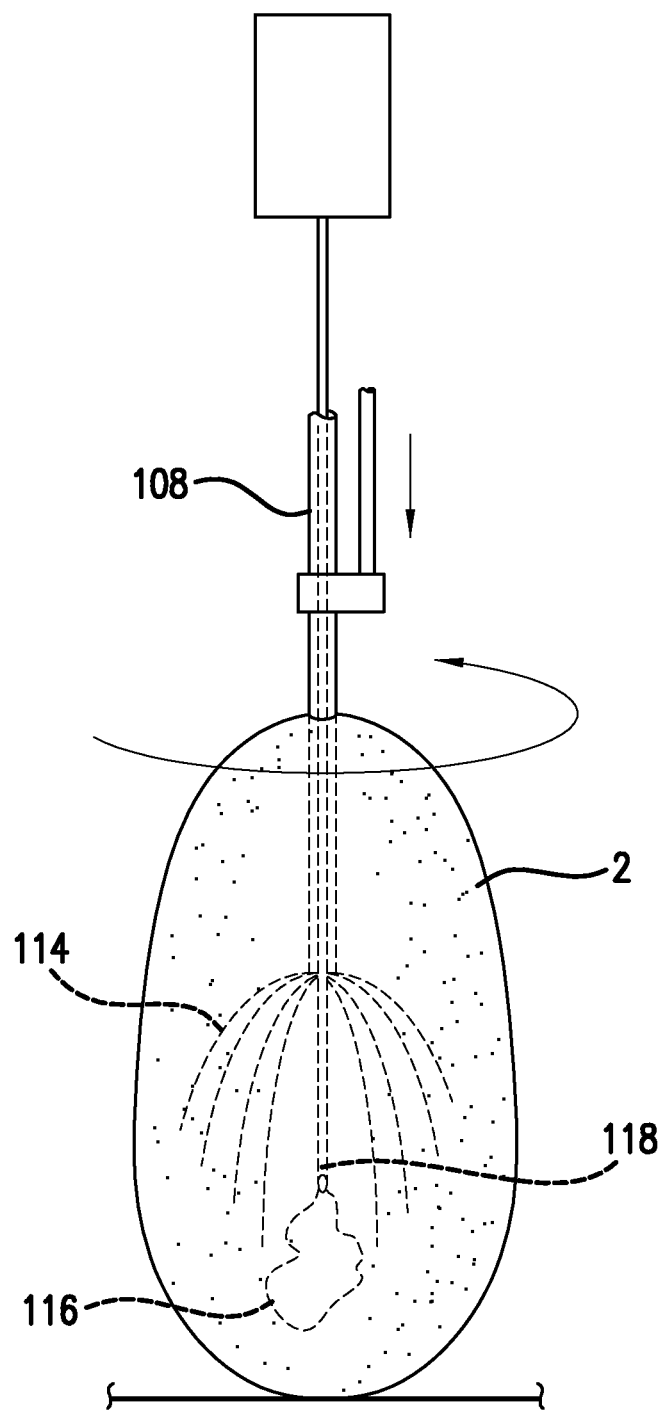
FIG. 6 shows an additional embodiment of the invention in which a device disturbs the flesh of a potato, injects a food material, and mixes the food material with the potato flesh.
Figure 7:
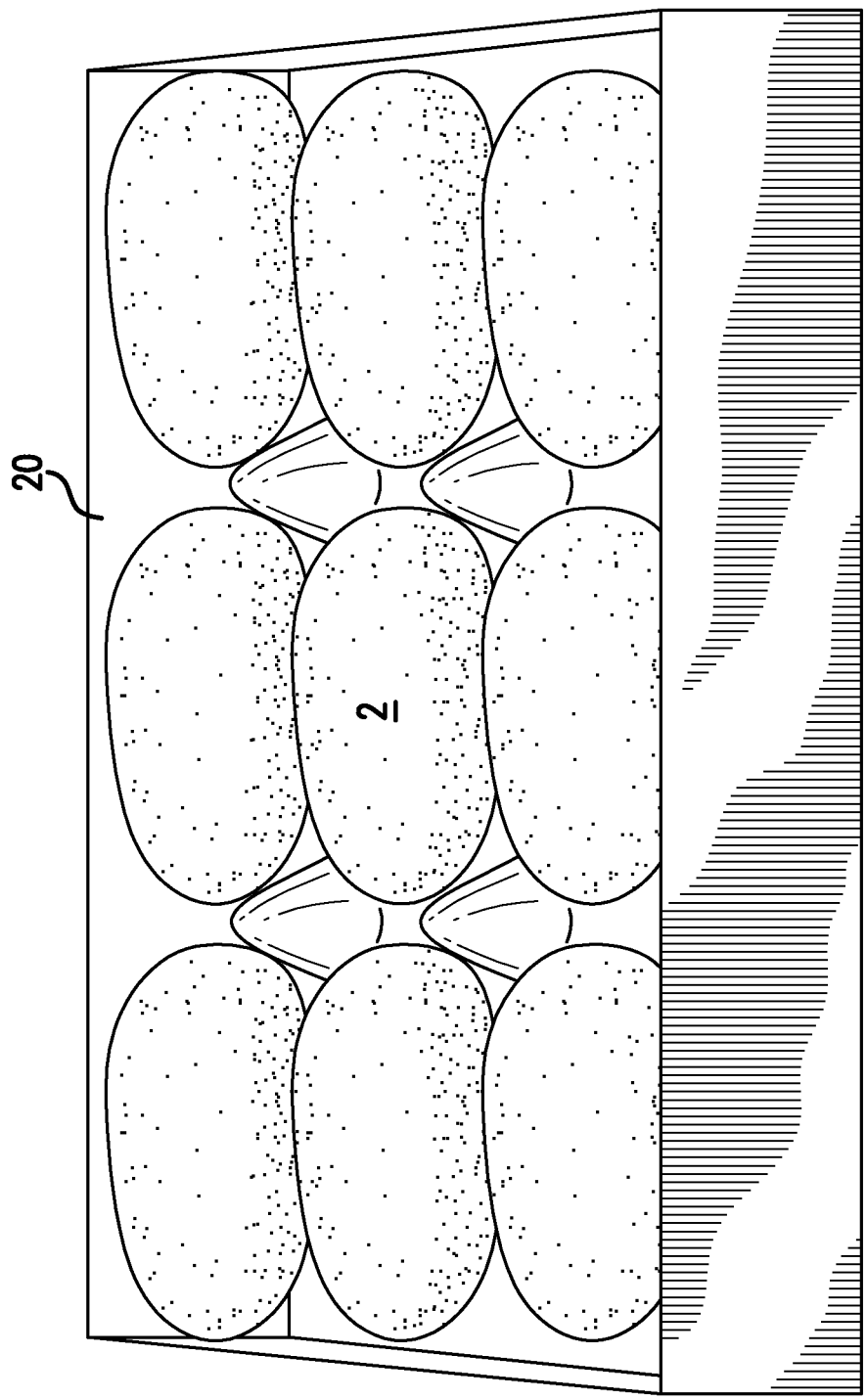
FIG. 7 demonstrates further packaging of potatoes prepared according to the invention.

FIG. 6 shows another embodiment of the invention. The device as shown in FIG. 6 pierces the skin of the flash frozen potato. Leaves 114 of a rotary tool expand to disturb the flesh of a potato. An injector 118 injects one or more food materials. The injector may have one or more orifices through which the food material is directed into the potato. The injector may be actuated as the device enters the top of the potato (as oriented in the drawing) and progressively moved downward to distribute the food product, and/or actuated as the device moves upward and within the potato. The rotary tool mixes the food material with the potato flesh. A single device as shown in this embodiment disturbs the flesh of the potato, injects the food material 116, and mixes the food material with the potato flesh. It is not necessary with this embodiment to insert multiple tools into the end of the potato to prepare the potato according to the invention.

The food materials that may be injected into the potato are substantially unlimited, but should be capable of being injected into the potato to substantially infiltrate the flesh of the potato. In another embodiment, food material is injected from both ends, and/or other voids formed in the skin of the potato for distribution of the food material relatively equally from end of the potato to the other. The food material that may be injected into the potato includes dairy, such as cheese, sour cream, and butter, as well as yogurt, meat products, vegetable products, and fungi, such as mushrooms. In some applications, it may be preferable to emulsify the food material.

After the additional food is injected into the potato, the potato may be further cooked, so that the skin is no longer flash-frozen. In a preferred embodiment, the potato is placed in a microwave oven and heated to bring the entire potato to a preferred consumption temperature, and, in the case of some added materials such as cheese, to melt the added material.

In other embodiments, after the food material is inserted into the potato, the entire potato is frozen, with the flesh being frozen in addition to the skin of the potato. The frozen potato may then be packaged, either individually or in quantities as shown in FIG. 6. The frozen food products may then be shipped in packages 20 to distribution outlets, such as grocery stores. The frozen potato product produced according to the invention may be subsequently prepared by the consumer at a remote location.

In a preferred embodiment, the frozen potato according to the invention is prepared for consumption by microwaving the potato, but the resulting potato may also be heated to the desired consumption temperature by other known cooking and heating methods, such as baking, boiling or steaming.

What is claimed is:

1. A method of preparing a tuber, comprising the steps of:
   cooking a tuber, wherein the tuber comprises flesh that is surrounded by skin of the tuber;
   freezing the tuber for a time and at a temperature to freeze the skin of the tuber while not freezing a portion of the flesh of the tuber;
   piercing the skin of the tuber to form a hole in the skin;
   accessing the portion of the flesh of the tuber through the hole in the skin;
   disrupting the portion of the flesh of the tuber;
   inserting food into the portion of the flesh of the tuber that is not frozen through the hole formed in the skin of the tuber; and
   disrupting the portion of the flesh of the tuber and mixing the food with the portion of the flesh of the tuber that is not frozen while the skin of the tuber is frozen.

2. A method of preparing a tuber as described in claim 1, further comprising the steps of inserting a rotating device through the hole in the skin of the tuber while the skin of the tuber is frozen, and wherein disrupting the portion of the flesh of the tuber is accomplished by rotation of the rotating device while the portion of the flesh of the tuber is unfrozen.

3. A method of preparing a tuber as described in claim 1, further comprising the steps of inserting a rotating device through the hole in the skin of the tuber while the skin of the tuber is frozen, and wherein disrupting the portion of the flesh of the tuber is accomplished by rotation of the rotating device, and wherein the rotating device is contracted during insertion of the rotating device through the hole in the skin and the rotating device is expanded for rotation of the rotating device in the flesh of the tuber, and the rotating device disrupts the portion of the flesh of the tuber while the portion of the flesh of the tuber is unfrozen.

4. A method of preparing a tuber as described in claim 1, wherein the step of freezing the skin of the tuber is performed by flash freezing.

5. A method of preparing a tuber as described in claim 1, further comprising the steps of freezing the tuber and the food after the food is inserted and the food is mixed with the flesh of the tuber, and subsequently heating the skin, the food and the flesh of the tuber to above room temperature.

6. A method of preparing a tuber as described in claim 1, wherein the tuber is a potato.

7. A method of preparing a tuber as described in claim 1, wherein the food that is inserted in the step of inserting food into the flesh of the tuber is not food from a variety of tuber.

8. A method of preparing a tuber as described in claim 1, wherein the food is in a flowable form, and the step of inserting food into the flesh of the tuber is performed with the food under pressure.

9. A method of preparing a tuber as described in claim 1, further comprising the steps of inserting a rotating device through the hole in the skin of the tuber while the skin of the tuber is frozen, and wherein the step of disrupting the flesh of the tuber is accomplished by rotation of the rotating device, and wherein the food is mixed with the portion of the flesh of the tuber that is not frozen by rotation of the rotating device in the presence of the food and the portion of the flesh of the tuber that is not frozen while the skin of the tuber is frozen.

10. A method of preparing a tuber as described in claim 1, wherein disrupted flesh of the tuber that is disrupted during the step of disrupting the portion of the flesh remains in the tuber and is surrounded by the skin of the tuber when the step of inserting food into the flesh of the tuber is performed.

11. A method of preparing a tuber as described in claim 1, wherein the skin of the tuber is frozen when the step of inserting food into the flesh of the tuber is performed.

12. A method of preparing a tuber as described in claim 1, wherein the skin of the tuber is frozen when the step of piercing the skin of the tuber to form a hole in the skin of the tuber is performed.

\* \* \* \* \*